Jan. 19, 1926.

W. E. HALE 1,569,925

DRAG SCRAPER

Filed March 5, 1923

WITNESS:
Rob't R. Kitchel.

INVENTOR
William E. Hale
BY
Augustus B. Stoughton
ATTORNEY.

Patented Jan. 19, 1926.

1,569,925

UNITED STATES PATENT OFFICE.

WILLIAM E. HALE, OF FORT WASHINGTON, PENNSYLVANIA, ASSIGNOR TO R. E. BEAU-MONT COMPANY, OF PHILADELPHIA, PENNSYLVANIA, A CORPORATION OF PENN-SYLVANIA.

DRAG SCRAPER.

Application filed March 5, 1923. Serial No. 622,835.

*To all whom it may concern:*

Be it known that I, WILLIAM E. HALE, a citizen of the United States, residing at Fort Washington, in the county of Montgomery and State of Pennsylvania, have invented a new and useful Improvement in Drag Scrapers, of which the following is a specification.

The drums of drag scrapers are turned in opposite directions by power supplied continuously and there are power application control or clutch devices for causing the drums to turn in forward and reverse directions and into neutral or stop or rest. It has been suggested to operate the power application and control or clutch devices by an electric motor having a manual controller.

To facilitate an understanding of the invention it may be said that there is one continuously running motor of which the function is to drive one or the other of the drums as may be called for by the clutch devices, and there is another motor which when the skip hoist is in operation is always energized to run in a direction appropriate for setting the clutch mechanism to forward or reverse according to the position of a hand controller, and at positions of forward or reverse this second motor while energized is prevented from running by the mechanical limit stops of the clutch mechanism. If the result of positioning the hand controller to stop was merely to deenergize this second motor, the clutch mechanism would not be shifted but would remain in a position fixed by its limit stop so that it is necessary in order to bring the clutch mechanism to neutral position in which it frees both drums from a position of forward and reverse not only to reverse this motor and run it to stop position of the clutch mechanism but also to stop or de-energize this motor in that position.

The principal object of the present invention is to provide for running the power application control or clutch devices to neutral position and stopping them in that position whenever the manual controller is set to stop, and to this and other ends hereinafter stated the invention may be said to comprise the combination with power application or clutch devices including a motor and a manual controller, of over-running switch connections adapted to maintain the motor circuit after the controller has been set to stop and until the switch connections are actuated by the power application devices to interrupt the motor circuit and stop the power application devices in neutral position.

The invention also comprises the improvements to be presently described and finally claimed.

Figure 1:
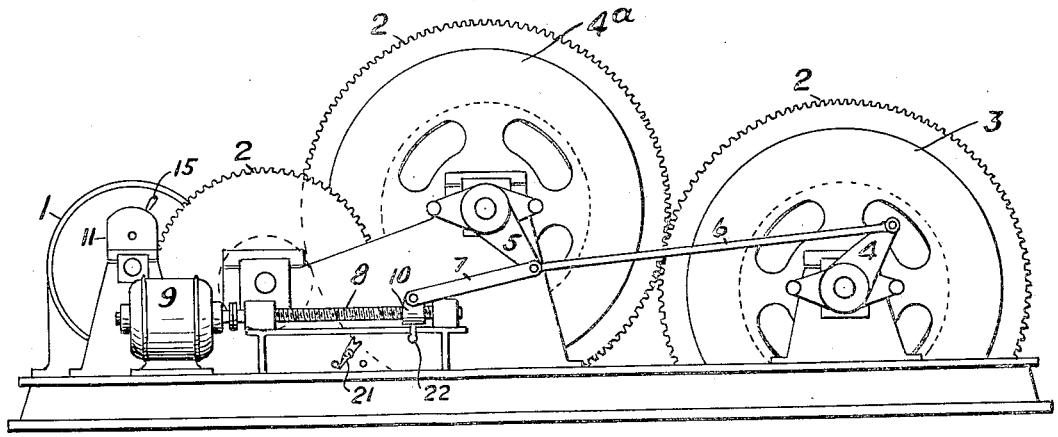

In the following description reference will be made to the accompanying drawings forming part hereof and illustrating an embodiment of the invention chosen from among other embodiments for the sake of explanation, and in those drawings Figure 1 is an elevational view of so much of drag scraper mechanism as is necessary for a description of the invention, one embodiment of which is also shown.

Figure 3:
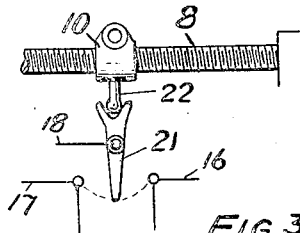
Figure 2:
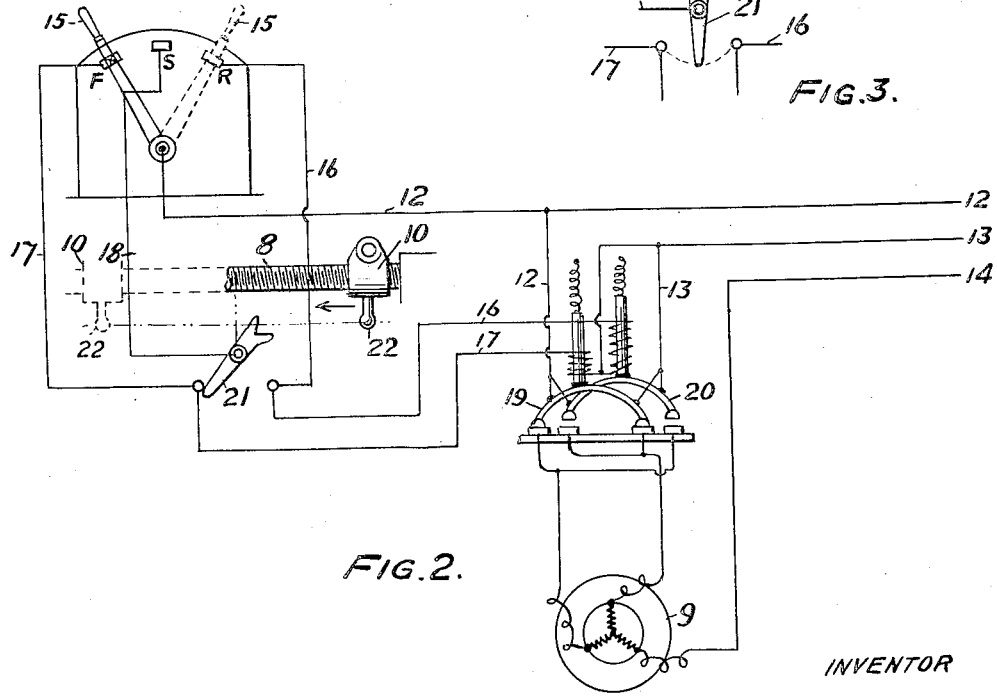

Fig. 2 is a diagrammatic view illustrating schematically features of the invention, and Fig. 3 is a detail view illustrating a different position of some of the parts shown in Fig. 2.

In the drawings 1 is a motor which is intended to continuously drive the gearing 2. The drum 3 is driven first in one direction, which may be called forward and then the drum 3 is permitted to run loose while the drum 4ᵃ is driven in the other direction which may be called reverse. Then the drum 4ᵃ runs loose and in this way the scraper is moved forward and reverse. The power application control devices function to connect and disconnect the drums in the manner described and also to disconnect both drums which means stop for the drag and neutral position for the power application and control devices. There is nothing particularly new about the mechanism above referred to and one form of which is shown in the drawing. When the arms 4 and 5 and the linkage 6 and 7 is in the position shown in Fig. 1 it will be assumed that the mechanism is in position for reverse, and when those parts are moved into their left-hand position the mechanism will be in forward and when the arms 4 and 5 are vertical there is neutral position and the drums are at rest although the motor 1 and gearing 2 may be in motion. It may be said that each of the arms 4 and 5 controls clutch mechanism adapted to connect and disconnect the drums 4ᵃ and 3 with the mechanism 2 according to the angular position of the arms and in the manner above indicated. There is nothing new about these arms 4 and 5 or about their provision and use for connecting and disconnecting the drums with the gearing and for that reason as well as for the sake of simplicity those provisions have not been specifically described. The screw 8 held against endwise motion and turned in both directions by the motor 9 in association with the travelling nut 10 connected with the linkage 6, is a power means for starting, stopping and reversing the drag scraper. It is not the function of the motor 9 to drive the gearing 2, and, as has been said, the gearing 2 is driven by the motor 1. 11 is a manual controller for the motor 9. The controller has provisions for establishing circuits through the motor 9 for forward and reverse and for establishing a neutral circuit path when set for stop. The lead 12 is connected with the arm 15 and the arm 15 may be turned to each of the contacts F, S and R. The contact R and the contact F are connected to the branches 16 and 17 from the lead 13, and the contact S is connected to a neutral circuit path 18. The connections 13 and 12 to the motor 9 are reversed by the switches 19 and 20 shown as closed by coils in the branches 16 and 17 and opened by springs when the coils are not energized. The motor 9 is connected to the lead 14. The switches 19 and 20 constitute the means for reversing the direction of motion of the motor 9 and for stopping and starting. 21 is a circuit changer and interrupter connected in the neutral circuit path 18 and responsive to the travel of the nut 10 which is provided with a tappet 22 that turns the part 21 into position for establishing a circuit path from 18 to branch 17, and a circuit path to branch 16, and into the position indicated in Fig. 3 for interrupting the circuit path when lever 15 is on contact S.

The mode of operation of the invention may be described in connection with the embodiment of it which has been above indicated as follows:

It may be assumed that the arm 15 is arranged as a remote control and is in the position indicated in full lines in Fig. 2 and that the motor 9 is running in the proper direction and that the part 22 is moving in the direction indicated by the arrow to bring about forward motion of the drag scraper. The motor 9 is a small torque motor and therefore may be at rest when the linkage 6, 7, and arms 4 and 5 are in their limiting positions. With the arm 15 in the full line position the circuit may be traced from 12 by 15 by 17 through coil of switch 19 to line 13. The switch 19 is closed and the switch 20 is open, because its circuit is broken at R. If it is desired to disconnect both drums 3 and 4ª and permit the motor 1 and gearing 2 to run, the arm 15 is moved to S, thus maintaining the motor circuit by way of 18 and 21 to branch 17, it being understood that by the previous operation of the machine the part 21 was left in the position shown in Fig. 2. The movement of the nut 10 continues toward the left until it reaches the position corresponding with the neutral position, i. e., the vertical position of the arms 4 and 5, and then the tappet 22 turns the part 21 into the position shown in Fig. 3, with the result that both of the switches 19 and 20 are opened by their springs because neither of their coils is energized, and the opening of these switches causes the motor 9 to stop with the drums in neutral position. If the arm 15 happened to be in the position shown in dotted lines in Fig. 2, the coil of the switch 20 would have been energized by way of 12, 15, 16 and 13 and the motor would have been running in the other direction and in a direction appropriate for reverse. Movement of the arm 15 from R to S would have maintained the motor circuit by 21 until the right hand travel of the nut moved part 21 into the position shown in Fig. 3, thereby stopping the motor when the arms 4 and 5 were in neutral, that is, vertical position. If arm 15 had been held in full line position until part 22 had run past 21 and then thrown to position S, motor 9 would then reverse bringing part 22 back into contact with part 21 moving same to the position shown in Fig. 3 and stopping the motor 9. From the foregoing description it will be evident that the part 21 and its accessories constitute an over-running switch which ensures that the motor 9 will stop only when the power application control devices are in neutral and when the distant control arm 15 has been previously set to stop position.

It will be obvious to those skilled in the art to which the invention relates that modifications may be made in details of construction and arrangement and in mere matters of form without departing from the spirit of the invention which is not limited as to such matters or otherwise than as the prior art and the appended claims may require.

I claim:

1. In a drag scraper the combination of continuously acting unidirectional power means, power application control devices, screw-and-nut mechanism adapted to actuate said devices to cause forward and reverse and neutral application of power, a motor for actuating said screw-and-nut mechanism, manual controller provisions for establishing circuits through the motor for forward and reverse and for establishing a neutral circuit path, set for stop mechanical limit stops for the motor and a circuit changer and interrupter interposed in the neutral circuit path and responsive to the travel of the nut to maintain the forward and reverse circuits through the motor until the nut reaches mid-travel position and operates the circuit changer and interrupter to stop the motor with the power application control devices in position for neutral application of power.

2. In a drag scraper the combination with continuously acting unidirectional power means, power application devices including a motor for reciprocating said devices and a circuit for the motor and a manual controller having a contact S for stop position, of mechanical limit stops for the motor, circuit changer and interrupter mechanism having series relation with the contact S of the controller and responsive to the movement of said power application devices and adapted to maintain the motor circuit through contact S of the controller until said devices reach mid-travel position and to then interrupt the motor circuit.

3. In a drag scraper the combination with continuously acting unidirectional power means, power application devices including a motor and its circuit and a manual controller, mechanical limit stops for the motor, of over-running circuit changer and interrupter connections adapted to maintain the motor circuit after the controller has been set to stop and until the said connections are actuated by said power application devices to interrupt the motor circuit and stop said devices in mid position.

4. In a drag scraper the combination of drums, a unidirectional continuously running power device for driving the drums, power application devices for causing the drums to run in either direction and to stop, a motor energized to set the power application devices in forward or reverse, mechanical limit stops for preventing the energized motor from running at those positions, a hand controller and circuit for reversing the motor, and circuit control means driven by the motor and adapted to automatically run it and the power application devices to drum release position and then de-energize the motor.

WILLIAM E. HALE.